United States Patent

Roth

[15] 3,694,065
[45] Sept. 26, 1972

[54] TRANSPORTING MECHANISM FOR MOTION PICTURE FILM

[72] Inventor: Johann Roth, Schwabhausen, Germany

[73] Assignee: Niezoldi & Kramer GmbH, Munich-Allach, Germany

[22] Filed: Nov. 2, 1970

[21] Appl. No.: 86,171

Related U.S. Application Data

[63] Continuation-in-part of Ser. No. 872,087, Oct. 29, 1969, Pat. No. 3,583,801.

[30]     Foreign Application Priority Data

Nov. 6, 1969     Germany..........P 19 55 756.3

[52] U.S. Cl. .................352/195, 352/162, 352/168, 352/173, 352/194
[51] Int. Cl. ..............................................G03b 1/22
[58] Field of Search......352/168, 169, 173, 174, 176, 352/180, 191, 194, 195

[56]     References Cited

UNITED STATES PATENTS

| | | |
|---|---|---|
| 3,447,868 | 6/1969 | Krumbein...................352/173 |
| 2,371,836 | 3/1945 | Masterson.................352/192 |
| 2,974,840 | 3/1961 | Kuhnert..................352/173 X |
| 3,533,688 | 10/1970 | Painton...................352/169 X |
| 3,402,007 | 9/1968 | Gerlach..................352/169 X |
| 2,588,813 | 3/1952 | Dube..........................352/173 |

Primary Examiner—Samuel S. Matthews
Assistant Examiner—Monroe H. Hayes
Attorney—Michael S. Striker

[57]     ABSTRACT

Transporting mechanism for film in motion picture projectors wherein the in-out cam is replaced with an electromagnet which is energized and deenergized in synchronism with the operation of that one of two transporting cams which move the shuttle lengthwise of the film, whereby the armature of the electromagnet causes the claw of the shuttle to enter into or to move out of the adjacent perforation. One of the transporting cams is operative when the film is transported forwardly, and the other cam moves the shuttle when the film is to move rearwardly.

17 Claims, 5 Drawing Figures

TRANSPORTING MECHANISM FOR MOTION PICTURE FILM

CROSS-REFERENCE TO RELATED APPLICATION

This is a continuation-in-part of my copending application Ser. No. 872,087 filed Oct. 29, 1969 and entitled "Pull-down Mechanism for Cinematographic Apparatus, now U.S. Pat. No. 3,583,801 granted June 8, 1971.

BACKGROUND OF THE INVENTION

The present invention relates to improvements in transporting mechanisms for motion picture film, and more particularly to improvements in pull-down mechanisms for use in cinematographic apparatus to effect intermittent transport of motion picture film along the film gate.

Still more particularly, the invention relates to improvements in transporting mechanisms for use in projectors for motion picture film.

My copending application Ser. No. 872,087 discloses a novel in-out cam which is used in the pull-down mechanism to compensate for unavoidable clearance between the claw of the pull-down lever or shuttle and the perforations of motion picture film. When the shuttle transports the film forwardly, its claw engages the leading edge of the adjacent perforation to advance the film by the length of a frame prior to being withdrawn from such perforation by the in-out cam. When the direction of the film transport is changed, the claw engages the trailing edge (at the opposite end) of the adjacent perforation. In the absence of any remedial measures, this causes a shift in the position of film frames with reference to the film gate, and such shift is due mainly to the aforementioned clearance between the claw and the perforations. The clearance is necessary to insure friction-free entry and withdrawal of the claw from perforations, and the extent of such clearance is sufficient to cause a shifting of film frames, with reference to the film gate whenever the drive for the shuttle is reversed. As a rule, the shift in the position of film frames in response to a reversal in the direction of operation of the drive for the shuttle corresponds to or is directly proportional with the clearance between the leading or trailing edge of a perforation and the claw.

The pull-down mechanism which is disclosed in the application Ser. No. 872,087 comprises two transporting cams one of which is tracked by the shuttle during forward transport and the other of which is tracked by the shuttle during rearward transport of motion picture film. The two cams are angularly offset with reference to each other to thereby compensate for the aforediscussed clearance. The shuttle further tracks the in-out cam which causes its claw to enter into or to be withdrawn from the adjacent perforation in synchronism with transporting strokes of the shuttle. The in-out cam is rotatable with reference to the transporting cams to the extent corresponding to angular displacement of one transporting cam with reference to the other transporting cam. This enables the in-out cam to synchronize the in-out movements of the claw with the transporting movements of the shuttle irrespective of whether the shuttle tracks the one or the other transporting cam.

SUMMARY OF THE INVENTION

An object of the invention is to provide a transporting mechanism for motion picture film wherein the in-out cam can be dispensed with so that the number of parts which are subject to wear as a result of friction is less than in presently known mechanisms.

Another object of the invention is to provide a pull-down mechanism for use in motion picture projectors which is more versatile and simpler than presently known mechanisms.

A further object of the invention is to provide a pull-down mechanism which can be installed in presently known cinematographic apparatus and which enables an operator to project images at several frequencies as well as to project the image of any desired film frame for as long as desired without the danger of overheating the film.

An additional object of the invention is to provide a pull-down mechanism wherein the in-out movements of the claw are invariably synchronized with forward or rearward transporting movements of the shuttle, which is less prone to malfunction than presently known mechanisms (especially because the wear on its parts is less likely to affect the accuracy of synchronization), and which can be employed with advantage in cinematographic apparatus for use by beginners, advanced amateurs or professionals.

Still another object of the invention is to provide a pull-down mechanism which is at least as compact as presently known mechanisms so that it can be readily installed in small portable cinematographic apparatus, whose energy requirements are low, and which can stand long periods of use without adverse effects on its accuracy.

The invention is embodied in a cinematographic apparatus for use with motion picture film having at least one row of perforations. The apparatus comprises a film gate, reversible drive means (for example, a reversible electric motor which drives a main shaft and whose input member is rotated in a single direction), shutter means rotated by the drive means and having at least one portion arranged to overlap the film gate at predetermined intervals, and a novel film transporting (pull-down) mechanism having a shuttle provided with film-advancing claw means, and first and second cams which are preferably angularly offset with reference to each other in a manner and for the purposes as disclosed in the application Ser. No. 872,087. The cams are rotatable by the drive means and respectively have first and second cam portions arranged to effect movements of the claw means in and counter to the normal direction of film travel. The transporting mechanism further comprises selector means which is operable to maintain the shuttle in engagement with one cam at a time so that the shuttle respectively receives motion from the first and second cams when the drive means respectively rotates in a first and second direction, electromagnet means having an energized condition and a deenergized condition and arranged to effect movements of the claw means into and away from adjacent perforations of motion picture film in response to changes in its condition, and control means for changing the condition of the electromagnet means in synchronism with rotation of that cam which is tracked by the shuttle. Thus, the functions of the in-out cam are performed by the electromagnet means whose circuit may include one or more normally open control switches which are actuatable by the drive means, always in synchronism with rotation of the selected cam, i.e., of that cam which is tracked by a follower of the shuttle.

The shuttle may consist of rigid or elastomeric material and can be displaced or deformed in response to changes in condition of energization of the electromagnet means.

If the control means comprises a single control switch, the main shaft of the drive means can carry a control member which is rotatable with reference to the main shaft through an angle corresponding to that between the angularly offset cams, and the control member closes the switch to change the condition of energization of the electromagnet means at least once during each revolution of the main shaft.

The main shaft can carry two angularly offset control member each of which can actuate a separate control switch. The selector means then comprises a two-way switch which connects one of the control switches in the circuit of the electromagnet means.

The novel features which are considered as characteristic of the invention are set forth in particular in the appended claims.

The improved transporting mechanism itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
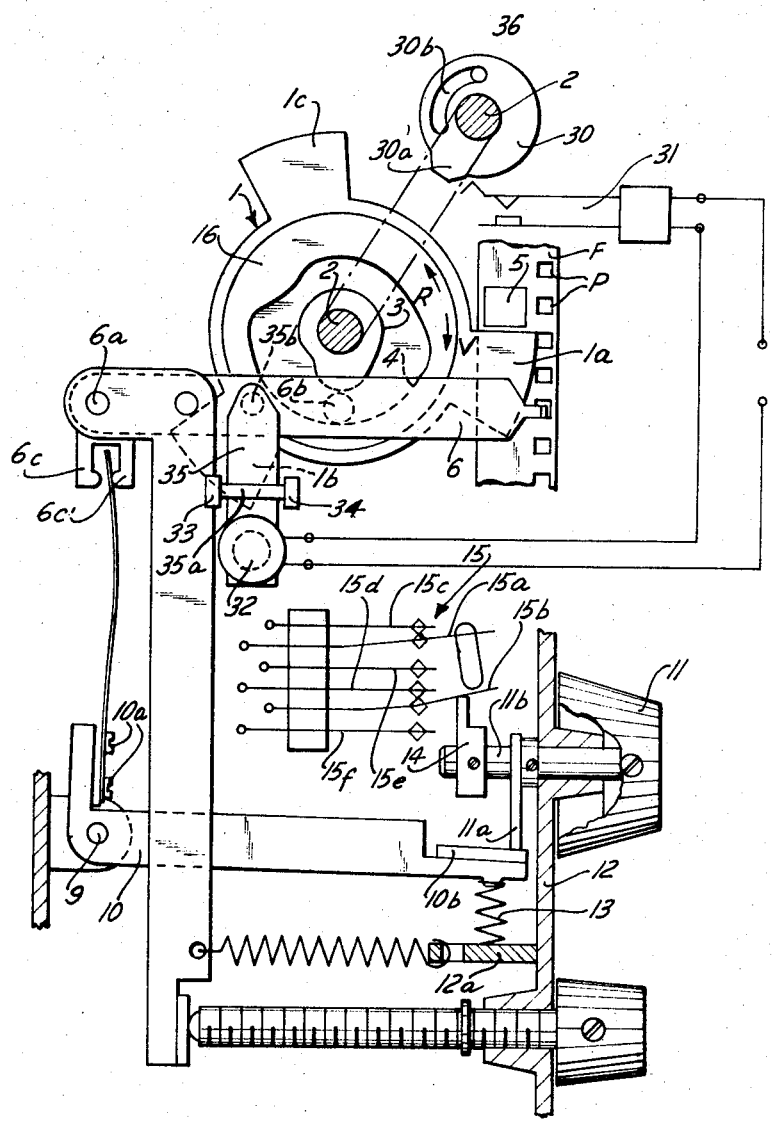
FIG. 1 is a fragmentary schematic partly elevational and partly sectional view of a cinematographic apparatus whose film transporting mechanism is constructed in accordance with a first embodiment of the invention and wherein the transporting mechanism is set to advance the film in a forward direction.

FIG. 1 illustrates a portion of a motion picture projector having a rotary disk shutter 1 which is driven by a reversible main shaft 2. The elastically deformable pull-down lever or shuttle 6 has a claw 6d and is pivotable on a pin 6a. The purpose of the claw 6d is to move successive frames of the motion picture film F into registry with the film gate 5. The film F has a row of perforations P into which the claw 6d extends during transport of the film forwardly or rearwardly, always by the length of a frame.

The means for imparting to the shuttle 6 all necessary movements in order to transport the film F forwardly or rearwardly, always by the length of a frame, comprises two coaxial transporting cams 3, 4 which are driven by the main shaft 2, and an electromagnet 32 which replaces the conventional in-out cam. The transporting cams 3, 4 form integral parts of a disk-shaped carrier 16 which is secured to the main shaft 2. These cams define an endless groove which receives a follower 6b of the shuttle 6. The cam 3 is an external surface; the film F is then transported in a forward direction. The cam 4 is an internal cam because the follower 6b tracks its internal surface when the film F is to be transported rearwardly.

The selector means which can effect movements of the follower 6b on the shuttle 6 into engagement with the transporting cam 3 or 4 comprises a leaf spring 8 whose free end is received between two prongs 6c, 6c' of the shuttle 6. The spring 8 is adjustably secured (by means of screws 10a) to a motion transmitting lever 10 which is fulcrumed at 9 and is biased in a counterclockwise direction by a helical spring 13. The spring 13 causes a pad 10b of the motion transmitting lever 10 to bear against an eccentric or arm 11a of a selector knob 11 having a stem 11b which is rotatably mounted in the housing 12 of the cinematographic apparatus. The spring 13 reacts against a bracket 12a of the housing 12. When it assumes the position shown in FIG. 1, the arm 11a maintains the spring 13 in a state of maximum compression and the motion transmitting lever 10 urges the leaf spring 8 against the prong 6c' whereby the shuttle 6 is biased in an anticlockwise direction and its follower 6 b engages the external surface of the transporting cam 3. The apparatus is then set to transport the film F in a forward direction (arrow V') as soon as the motor which drives the main shaft 2 is started.

Figure 2:
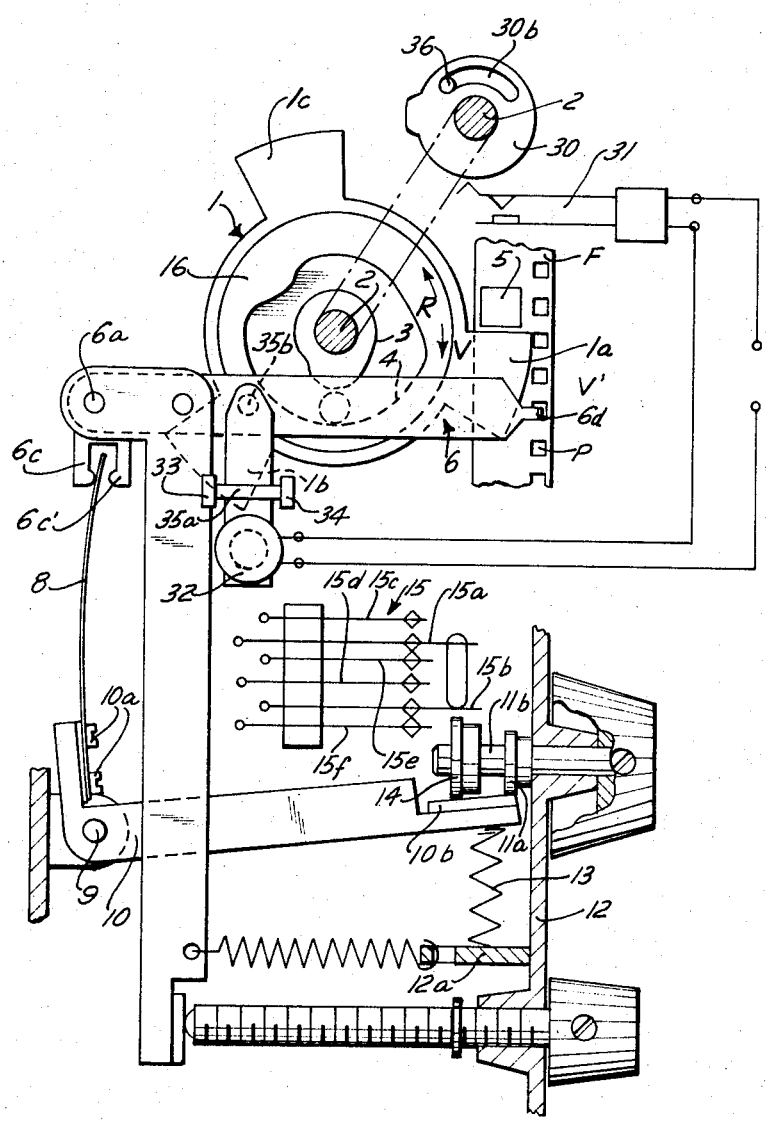
FIG. 2 illustrates the structure of FIG. 1 but with the transporting mechanism ready to transport the film in a rearward direction.

When the selector knob 11 is rotated through 90° to assume the position shown in FIG. 2, the spring 13 expands and the lever 10 causes the leaf spring 8 to bear against the prong 6c so that the shuttle 6 is biased in a clockwise direction and the follower 6b tracks the internal surface of the transporting cam 4. The cinematographic apparatus is then ready to transport the film F in a rearward direction (arrow R') at intervals determined by rotational speed of the main shaft 2, always by the length of a frame. The leaf spring 8 constitutes an elastic extension of the motion transmitting lever 10; this spring can be replaced with a rigid arm which is secured to or is integral with the lever 10 if the rigid prongs 6c, 6c' of the shuttle 6 are replaced with elastic prongs.

The stem 11b of the selector knob 11 is provided with an actuating member or trip 14 which can actuate an electric reversing switch 15 serving to reverse the direction of rotation of the motor which drives the main shaft 2. In the position shown in FIG. 1, the switch 15 causes the motor to rotate in a forward direction as soon as the master switch (not shown) in the motor circuit is closed.

The cam 4 is angularly offset with reference to the cam 3 by 120°. Furthermore, the internal surface of the cam 4 is configurated in such a way that the necessary clearance between not claw 6d and the perforations P does nor adversely affect the film transport in response to a change in the direction of rotation of the main shaft 2. This is achieved by selecting the configuration of the internal surface on the cam 4 in such a way that, when the apparatus is ready to transport the film F rearwardly, the claw 6d is adjacent to the upper edge of the adjoining perforation P while the shuttle 6 begins a movement to cause the film F to move in a rearward direction (arrow R' in FIG. 2). Thus, the cam 4 automatically compensates for a change in the position of the film frames in response to a change in the direction of film transport. As mentioned hereinbefore, such change in the position of film frames is due to the necessary clearance between the claw 6d and one edge of the adjoining perforation P. When the motor drives the main shaft 2 in a rearward direction, the contacts of the reversing switch 15 assume the positions shown in FIG. 2. It is clear that the main shaft 2 can be rotated in two directions without necessarily resorting to a reversible electric motor. For example, the cinematographic apparatus may be provided with a motor which rotates in a single direction and with a reversible transmission which is installed between the output shaft of the motor and the main shaft 2.

In FIG. 1, the trip 14 on the stem 11b of the selector knob 11 maintains the movable contacts 15a, 15b in engagement with the fixed contacts 15c, 15d of the reversing switch 15. Such setting is necessary in order to cause the motor to rotate the main shaft 2 in a forward direction (arrow V). When the knob 11 is rotated through 90° to assume the position shown in FIG. 2, the movable contacts 15a, 15b respectively engage the fixed contacts 15e, 15f of the switch 15; the motor is then ready to rotate the main shaft 2 in a rearward direction (arrow R) as soon as the master switch is closed. The movable contacts 15a, 15b are elastic and tend to assume the positions shown in FIG. 2. It will be seen that the stem 11b of the selector knob 11 synchronizes the movements of movable contacts 15a, 15b with those of the follower 6b so that the motor for the main shaft 2 is automatically set to rotate the main shaft in the desired direction as soon as the follower 6b is moved from engagement with the transporting cam 4 into engagement with the transporting cam 3, or vice versa.

The parts shown in the lower portion of FIG. 1 serve to facilitate accurate adjustments in the position of the claw 6d. Such parts are described and claimed in the copending application Ser. No. 872,057.

As mentioned above, the customary in-out cam which is used in conventional transporting mechanisms to effect movements of the claw on the shuttle into and out of the adjacent perforation of motion picture film is replaced with an electromagnet 32. The electromagnet 32 is in circuit with an energy source ES and with a switch 31 which causes energization and deenergization of the electromagnet in response to rotation of the main shaft 2. The switch 31 forms part of a control unit which further includes a disk-shaped control member 30 rotatably mounted on the main shaft 2 and having an actuating portion or trip 30a which can close the switch 31. The disk 30 has an arcuate slot 30b for an entraining pin 36 which is mounted on the main shaft 2. The movements of the disk 30 are synchronized with those of the shuttle 6 so that the claw 6d is caused to enter or leave the adjacent perforation P whenever the shuttle reaches the one or the other end position.

The electromagnet 32 has an armature 35 having a shaft 35a which is journalled in bearings 33, 34 of the housing 12. The armature 35 is a two-armed lever one arm of which can be pivoted by the electromagnet 32 and the other arm of which carries a protuberance or pusher 35b movable into engagement with the adjacent portion of the shuttle 6 to thereby force the claw 6d into the adjoining perforation P. The protuberance 35b is preferably of rounded (for example, semispherical) outline.

The main shaft 2 can rotate with reference to the disk 30 through an angle of 120°, i.e., through an angle corresponding to angular displacement of the transporting cams 3, 4 with reference to each other. Thus, the slot 30b extends along an arc of 120°. When the main shaft 2 rotates the transporting cams 3, 4 and the shutter 1 in a forward direction (arrow V in FIG. 1), the entraining pin 36 is located in the right-hand end portion of the slot 30b and the disk 30 shares the rotary movement of the main shaft as soon as the latter completes an angular movement through 120°. The trip 30a then closes the switch 31 once during each revolution of the main shaft 2. If the knob 11 is thereupon moved to the angular position shown in FIG. 2 and the master switch in the motor circuit is closed, the main shaft 2 begins to rotate in a counterclockwise direction (arrow R) and its pin 36 entrains the disk 30 as soon as the main shaft completes an angular movement through 120°. The electromagnet 32 is thereupon energized once during each revolution of the main shaft 2 but the timing of its energization is changed in such a way that the claw 6d can perform the necessary in- and out-movements to transport the motion picture film F in a rearward direction (arrow R' in FIG. 2).

Figure 3:
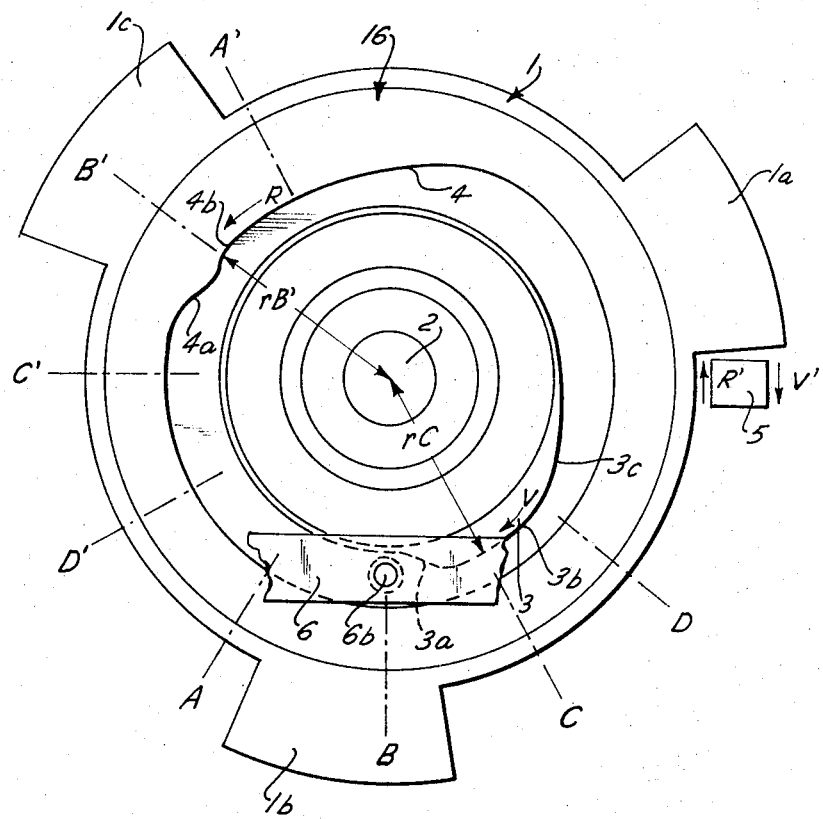
FIG. 3 is an enlarged view of a detail in the structure of FIG. 1 or 2.
Figure 4:
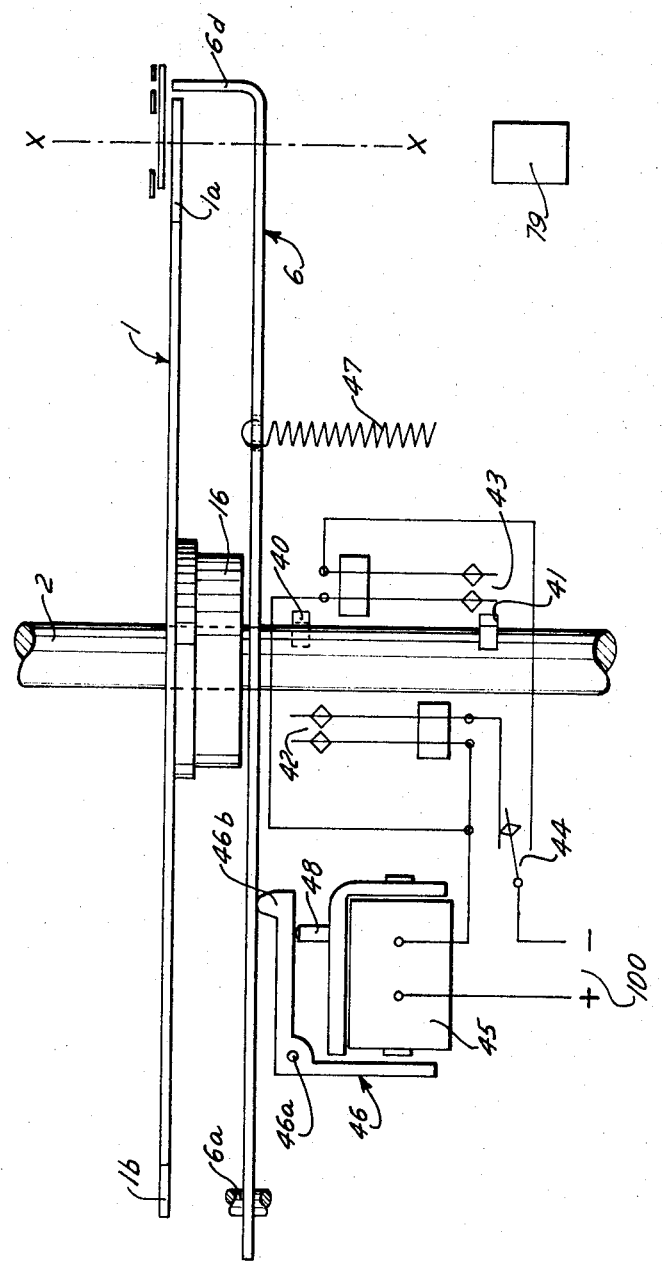
FIG. 4 is a fragmentary schematic view of a second transporting mechanism.

The manner in which the operation of parts which effect changes in the condition of the electromagnet 32 is synchronized with the operation of parts which cause the shuttle 6 to perform forward and rearward movements (in response to tracking of the cam 3 or 4) will be understood with reference to FIG. 3 which is similar to FIG. 4 in my copending application Ser. No. 872,057.

If the selector knob 11 is moved to the position shown in FIG. 1 and the master switch in the circuit of the motor for the main shaft 2 is closed, the main shaft is rotated in clockwise direction and rotates with reference to the disk 30 so as to move the pin 36 from the position shown in FIG. 2 to that shown in FIG. 1. From then on, the disk 30 rotates with the main shaft 2 and with the carrier 16. The lobe 30a of the disk 30 begins to close the switch 31 to energize the electromagnet 32 in the angular position A of a selected point on the main shaft 2. The energization of electromagnet 32 is completed not later than when the selected point on the main shaft 2 reaches the angular position B whereby the pusher 35b on the armature 35 of the energized electromagnet 32 flexes the elastic shuttle 6 and causes the claw 6d to enter the adjacent perforation P. The follower 6b tracks a rising portion or flank 3a on the external surface of the cam 3 while the selected point on the main shaft 2 moves from the position B to the position C whereby the shuttle 6 is pivoted clockwise, as viewed in FIG. 1, and causes the inserted claw 6d to advance the film F (arrow V') by the length of a frame. During forward transport of the film F, the gate 5 is overlapped by the vane 1a of the shutter 1.

The tip 30a moves beyond the switch 31 and causes deenergization of the electromagnet 32 while the selected point on the main shaft 2 moves from the position C to the position D of FIG. 3. The armature 35 then permits the shuttle 6 to reassume its undeformed condition and to withdraw the claw 6d from the adjacent perforation. At the same time, the follower 6d tracks on arcuate portion 3b of the external surface on the cam 3. The center of curvature of the portion 3b is located on the axis of the main shaft 2 so that the shuttle 6 is at a standstill while its claw 6d moves out of the adjacent perforation P (the shuttle is permitted to flex but it does not turn about the axis of the pivot pin 6a). Thereupon, the follower 6b tracks a descending portion 3c of the surface on the cam 3 so that the shuttle 6 pivots in a counterclockwise direction, as viewed in FIG. 1, and moves its claw 6d into proper position for engagement with the front edge of the next-following perforation P. The position of the film frame upon completion of a transport in forward direction depends on the radius rC of curvature of the cam surface portion 3b. Since the portion 3a of the surface on the cam 3 merely effects the forward stroke of the claw 6d, its position and configuration can be selected in exact conformity with the position of the vane 1a of the shutter 1. The length of the vane 1a, as considered in the circumferential direction of the shutter, slightly exceeds the distance between the lines B and C shown in FIG. 3, i.e., the vane 1a should overlie the film gate 5 immediately before, during and immediately after a stepwise advance of the film F. The image is projected while the vane 1a travels beyond the gate 5 and is completed when the gate 5 is again overlapped by the vane 1a. The vanes 1b, 1c move in front of the gate 5 during the projection of image of that film frame which registers with the gate 5. This prevents unsteadiness in the apparent intensity of the motion picture image (known as flicker). Thus, only the vane 1a serve to overlie the gate 5 during forward transport of the film F.

In order to transport the film F rearwardly, the selector knob 11 is moved to the position of FIG. 2 so that the follower 6b engages the internal surface of the transporting cam 4. The claw 6d is then ready to transport the film rearwardly as indicated by the arrow R'. The actual transport of film F in the direction indicated by the arrow R' is effected by the claw 6d while the electromagnet 32 is energized and while the follower 6b tracks the rising portion 4a of the internal surface on the cam 4. The carrier 16 then rotates in a counterclockwise direction as indicated by the arrow R. The penetration of the claw 6d into the adjacent perforation P begins when a selected point on the main shaft 2 assumes the position D' of FIG. 3 and is terminated when such point on the main shaft reaches the position C'. The film F is thereupon transported by the length of a frame (arrow R') while the selected point on the main shaft moves between the positions C' and B'. The electromagnet 32 is deenergized and the claw 6d is caused to leave the adjacent perforation P while the selected point on the main shaft 2 moves from the position B' to the position A' of FIG. 3. The configuration of the cam surface portion 4a is selected in such a way that the vane 1b overlies the gate 5 while the film is being transported in the direction indicated by the arrow R'. The angle along which the vane 1b extends (as considered in the circumferential direction of the shutter 1) slightly exceeds the angle between the lines C'–B' of FIG. 3. The position of the film F upon completion of a stepwise advance in the direction indicated by the arrow R' depends on the radius rB' of curvature of the surface portion 4b on the cam 4. The vanes 1c, 1a move across the light path during the projection of the image of that film frame which registers with the gate 5. Thus, only the vane 1b serves to cover the gate 5 during transport of film (arrow R') under the action of the cam 4.

The slot 30b in the disk 30 enables the main shaft 2 to rotate with reference to the disk 30 whenever the direction of rotation of the main shaft is changed. This insures that the changes in energization of electromagnet 32 are properly synchronized with transporting movements of the shuttle 6 (about the axis of the pivot pin 6a) irrespective of whether the shaft 2 is driven in direction indicated by arrow V or by arrow R. Thus, the electromagnet 32 and its armature 35 constitute an effective substitute for the in-out cam which is used in the cinematographic apparatus of my copending application Ser. No. 872,057.

FIG. 4 illustrates a portion of a modified cinematographic apparatus. The main shaft 2 is rigid with a carrier 16 for the transporting cams 3 and 4 (not shown). The shuttle is shown at 6, its pivot pin at 6a, and its claw at 6d. The main shaft 2 further drives a shutter 1 whose vanes (only the vanes 1a, 1b shown) travel along a circular path extending in front of the film gate 5. The optical axis of the projection lens (not shown) is indicated by the phantom line X—X, and the motion picture film is shown at F.

The in-out cam is replaced by an electromagnet 45 whose armature pivot is a two-armed lever 46 mounted in the housing of the cinematographic apparatus on a pivot pin 46a and having a rounded protuberance or pusher 46b which can be caused to bear against a median portion of the shuttle 6 in order to cause entry of the claw 6d into the adjacent perforation of the film F. The control system which regulates the changes in condition of the electromagnet 45 comprises two axially spaced lobes or actuating members 40, 41 provided on the main shaft 2 and respectively serving to actuate normally open switches 42, 43 which can be connected into the circuit of the electromagnet. The means for selectively connecting the switch 42 or 43 into the circuit of the electromagnet 45 preferably includes a selector knob such as the knob 11 of FIGS. 1 and 2. The knob 11 (not shown in FIG. 4) can change the position of a two-way selector switch 44. In the position shown in FIG. 3, the switch 44 connects the switch 42 in circuit with the electromagnet 45 and an energy source 100.

The lobes 40,41 on the main shaft 2 are angularly offset with reference to each other in such a way that they respectively cause an energization of the electromagnet 45 at desired intervals when the follower (not shown) of the shuttle 6 respectively tracks the transporting cams 3 and 4. The two-way selector switch 44 is actuated in (e.g., response to rotation of the knob 11, i.e., in response to movement of the follower on the shuttle 6 into engagement with the cam 3 or 4. When the switch 44 assumes the position shown in FIG. 4, intermittent closing of the switch 43 by the lobe 41 has no effect on the condition of the electromagnet 45. Inversely, when the switch 44 connects the switch 43 in circuit with the electromagnet 45, intermittent closing of the switch 42 by the lobe 40 cannot influence the condition of the electromagnet 45. The shuttle 6 may consist of elastic material (e.g., spring steel) and normally tends to withdraw its claw 6d from the adjacent perforation P. Thus, when the shuttle 6 is engaged by the pusher 35b or 46b, it is caused to flex to the extent necessary to introduce the claw 6b into the adjacent perforation P of the film F. FIG. 4 shows a helical return spring 47 which is connected to a stationary part of the housing and tends to pivot the shuttle 6 in the plane of FIG. 4 and in a clockwise direction so as to withdraw the claw 6d from the adjacent perforation. Such spring is optional if the innate elasticity of the shuttle 6 suffices to effect withdrawal of the claw 6d from the adjacent perforation in response to deenergization of the electromagnet 32 or 45. A stop 48 on the bracket for the electromagnet 45 serves to arrest the shuttle 6 in that position in which the claw 6d is fully withdrawn from the adjacent perforation.

The control system of FIG. 4 is somewhat simpler (particularly as regards its mechanical parts) than but is just as reliable as the control system of FIG. 1.

The feature that the lobes 40, 41 are angularly offset with reference to each other brings about the same advantage as the provision of the slot 30b in the disk 30 of FIGS. 1 and 2. Thus, when the main shaft 2 rotates in a forward direction (arrow V in FIG. 1), the electromagnet 32 or 45 causes the claw 6d to penetrate into the adjacent perforation P in such position that it engages the front edge of such perforation and immediately begins to transport the film F (arrow V') as soon as the shuttle 6 begins to pivot about the axis of the pin 6a. On the other hand, when the main shaft 2 rotates in the opposite direction (arrow R in FIG. 2), the electromagnet 32 or 45 causes the claw 6d to enter the adjacent perforation P in such position that it engages the rear edge of the perforation and is immediately in a position to transport the film F (arrow R') as soon as the shuttle 6 begins to pivot in the opposite direction (e.g., counterclockwise, as seen for the shuttle 6 of FIGS. 1 and 2). Thus, the slot 30b and the lobes 40, 41 compensate for the unavoidable clearance with which the claw of the shuttle must enter the perforations of motion picture film so that the film is invariably advanced by the length of a frame, irrespective of whether it moves forwardly or rearwardly. This not only eliminates the need for manual adjustments but also insures that the transport of motion picture film in either direction always takes place when the film gate 5 is overlapped by the vane 1a or 1b of the shutter 1.

Figure 5:
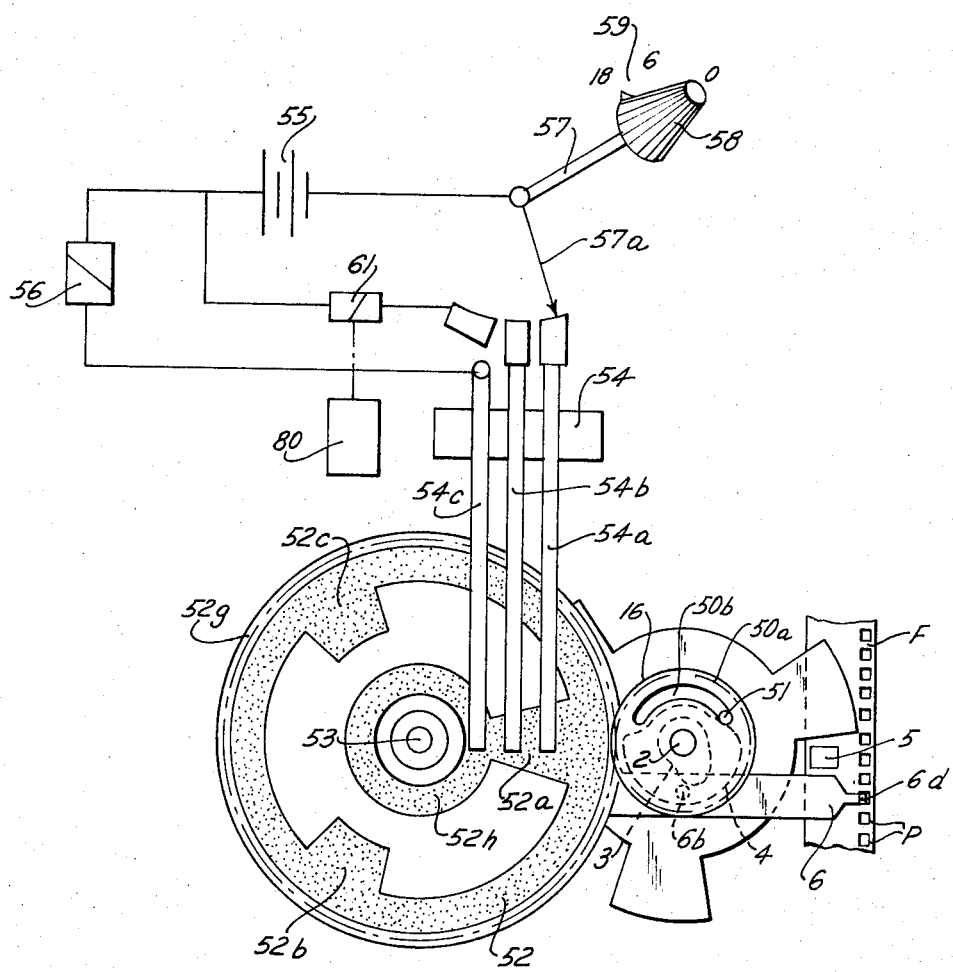
FIG. 5 is a fragmentary schematic view of a third mechanism which is designed to transport the film at several speeds.

The cinematographic apparatus of FIG. 5 is similar to that of FIGS. 1 and 2. The control disk 50 on the main shaft 2 corresponds to the disk 30 of FIG. 1 and is provided with an arcuate slot 50b for a pin 51 which is rotated with the main shaft. The follower 6b of the shuttle 6 extends into the groove between the transporting cams 3 and 4. The control disk 50 is rotatable on the main shaft 2 to the extent of relative angular displacement of the cams 3 and 4. These cams form part of a carrier 16. The pin 51 can be provided on the carrier or on the shutter 1.

The marginal portion of the control disk 50 constitutes a gear whose teeth 50a mesh with the teeth 52g of a contact carrying disk 52 mounted on a shaft 53. The disk 52 is provided with equidistant sector-shaped contacts 52a, 52b, 52c which rotate with reference to stationary contacts 54a, 54b, 54c mounted in an insulator 54. The dimensions of the sectors 52a–52c (as considered in the radial direction of the contact carrying disk 52) are different and the fixed contact 54a is positioned in such a way that it can engage each of these sectors. The fixed contact 54b can engage only the longest sector 52a. The sector 52a is connected with a ring-shaped central contact 52h which surrounds the shaft 53 and is further electrically connected with the sectors 52b and 52c (for example, by conductors extending through or along the rear side of the disk 52). The ring-shaped contact 52h is permanently engaged by the contact 54c which is in circuit with an energy source 55 and is connected to one terminal of an electromagnet 56 corresponding to the electromagnet 32 of FIG. 1. The contact 54a or 54b can be connected to the other terminal of the electromagnet 56 by the movable contact 57a of a multi-way selector switch 57.

If the cinematographic apparatus is to operate at the customary frequency of eighteen frames per second, the movable contact 57a is moved into engagement with the contact 54a (by way of a manually operated selector knob 58 having an index which is movable along a stationary scale 59).. As stated before, the tip of the contact 54a comes into engagement with each of the sector-shaped contacts 52a–52c when the disk 52 is rotated by the control disk 50. The dimensions of the disks 50, 52 are such that the disk 50 performs three revolutions for each revolution of the disk 52. Thus, if the main shaft 2 rotates at 18 revolutions per second, the disk 52 rotates at 6 revolutions per second and the circuit of the electromagnet 56 is completed and opened 18 times per second because the contact 54a completes the circuit of the electromagnet 56 three times during each revolution of the disk 52.

If the movable contact 57a of the switch 57 is moved into engagement with the fixed contact 54b, the circuit of the electromagnet 56 is completed and opened once during each revolution of the disk 52 (because the contact 54b can engage only the sector 52a) so that the electromagnet 56 is energized and deenergized 6 times per second. Thus, two out of each three pivotal movements of the shuttle 6 about its pivot pin 6a take place when the claw 6d is disengaged from the film F. Such slow-motion transport of film is particularly desirable in motion picture projectors for the analysis of movements which were photographed at the normal frequency of 18 frames per second.

The rotation of disk 52 in response to a change in the direction of rotation of the main shaft 2 is delayed due to the provision of the slot 50b and pin 51 for the reasons which were explained in connection with FIGS. 1 and 2, i.e., to insure that the claw 6d engages the leading edge of the adjacent perforation P when the shaft 2 rotates in a forward direction and that the claw 6d engages the rear edge of the perforation when the film is transported rearwardly. Thus, the slot 50b again compensates for the unavoidable clearance with which the claw 6b enters the perforations of the film F. The contacts on the disk 52 and the contacts 54a, 54b constitute a control switch which is indirectly actuated by the control disk 50. This control switch changes the condition of the electromagnet 56 at the desired frequency, always in synchronism with rotation of that cam (3 or 4) which transmits motion to the shuttle 6.

The cinematographic apparatus of FIG. 5 further comprises means for projecting an image for any desired period of time while the shutter 1 continues to rotate. Such means includes the movable contact 57a of the aforementioned switch 57, the contact 54c and an electromagnet 61 in parallel with the electromagnet 56. The knob 58 must be moved to a position in which its index registers with the zero graduation of the scale 59 so that the movable contact 57a of the switch 57 engages a terminal 60 which is connected with the electromagnet 61. The purpose of the electromagnet 61 is to place a customary heat-protecting filter 80 into the path of light which issues from the projection lamp 79 (seen FIG. 4). Such filter protects from excessive heat that frame whose image is to be projected for an indefinite period of time. When the contact 57a engages the terminal 60, the circuit of the elctromagent 56 remains open (i.e., the control means 50, 54a, 54b, 52a–5252h for the electromagnet 56 is idle) SO that the claw 6d of the shuttle 6 cannot penetrate into the adjacent perforation P of the film F. Thus, the cam 3 or 4 merely causes the shuttle 6 to pivot on its pin 6a but the claw 6d does not penetrate into or moves out of the perforations P. The main shaft 2 rotates at the normal speed of 18 revolutions per second and the shutter 1 rotates at the same speed. The three vanes 1a, 1b, 1c of the shutter overlie the film gate 5 a total of fiftyfour times per second. Such frequent interruption of light which issues from the lamp 79 and impinges on the film frame in the gate 5 results in a substantial reduction of heating action upon the film frame. Consequently, the filter 80 which has been moved into the path of light from the lamp 79 in response to energization of the electromagnet 61 must absorb relatively small amounts of heat energy, i.e., much less heat than in presently known projectors wherein the shutter is at a standstill when a particular film frame is to be viewed for longer periods of time. Therefore, the filter 80 which is controlled by the electromagnet 61 may be of the type which transmits substantial amounts of light. The clarity and other characteristics of projected image of the film frame in the gate 5 are very satisfactory because the filter 80 effects a relatively small reduction in the intensity of projected light and because of the high frequency at which the vanes 1a–1c of the shutter 1 move past the gate.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptions should and are intended to be comprehended within the meaning and range of equivalence of the claims.

What is claimed as new and desired to be protected by Letters Patent is:

1. In a cinematographic apparatus for use with film having a row of perforations, a combination comprising reversible drive means; and film transporting means comprising a shuttle having film-advancing claw means, first and second cams rotatable by said drive means and respectively having first and second cam portions arranged to move said claw means in and counter to the normal direction of film transport as well as to compensate for clearances between said claw means and the perforations, selector means operable to maintain said shuttle in engagement with one of said cams at a time so that the shuttle respectively receives motion from said first and second cams when said drive means respectively rotates in a first and a second direction, electromagnet means having energized and deenergized conditions and arranged to effect movements of said claw means into and away from adjoining perforations in response to changes in the condition thereof, and control means for changing the condition of said electromagnet means in synchronism with rotation of that cam which moves said shuttle.

2. A combination as defined in claim 1, wherein said electromagnet means is arranged to effect movements of said claw means into the adjoining perforations in response to energization thereof.

3. A combination as defined in claim 1, wherein said cams are angularly offset with reference to each other through a predetermined angle and said control means comprises a rotary control member driven by said drive means and rotatable with reference to said drive means through an angle corresponding to said predetermined angle.

4. A combination as defined in claim 3, wherein said control means further comprises switch means in circuit with said electromagnet means and actuating means provided on said control member and operative to actuate said switch means in response to rotation of said control member to thereby intermittently change the condition of said electromagnet means.

5. A combination as defined in claim 1, wherein said cams are angularly offset with reference to each other through a predetermined angle and said control means comprises first and second control members driven by said drive means and angularly offset with reference to each other through said predetermined angle.

6. A combination as defined in claim 1, wherein said cams are angularly offset with reference to each other through a predetermined angle and said control means comprises a rotary control member driven by said drive means and rotatable with reference to said drive means through said predetermined angle and control switch means in circuit with said electromagnet means and indirectly actuated by said control member to change the condition of said electromagnet means in synchronism with movements of said shuttle under the action of said first and second cams when said drive means respectively rotates said control member in said first and second directions.

7. A combination as defined in claim 6, wherein said control switch means comprises stationary first contact means and rotary second contact means receiving motion from said control member.

8. A combination as defined in claim 1, further comprising a gate and means for inactivating said control means so as to permit the retention of a selected film frame in registry with said gate for desired periods of time, and shutter means driven by said drive means and having vane means travelling along a path a portion of which is located in front of said gate.

9. A combination as defined in claim 8, further comprising heat-protecting filter means and means for moving said filter means into registry with said gate in response to inactivation of said control means.

10. A combination as defined in claim 9, wherein said cinematographic apparatus is a motion picture projector having a light source and said filter means is movable between said light source and the film frame in said gate.

11. A combination as defined in claim 10, wherein said means for moving said filter means comprises second electromagnet means in parallel with said first mentioned electromagnet means.

12. In a cinematographic apparatus for use with film having a row of perforations, a combination comprising a gate; reversible drive means; and film transporting means comprising a shuttle having film-advancing claw means, first and second cams rotatable by said drive means and respectively having first and second cam portions arranged to effect movements of said claw means in and counter to the normal direction of film transport; said cams being angularly offset with reference to each other through a predetermined angle, selector means operable to maintain said shuttle in engagement with one of said cams at a time so that the shuttle respectively receives motion from said first and second cams when said drive means respectively rotates in a first and second direction, electromagnet means having energized and deenergized conditions and arranged to effect movements of said claw means into and away from adjoining perforations in response to changes in the condition thereof, control means for changing the condition of said electromagnet means in synchronism with rotation of that cam which transmits motion to said shuttle, said control means comprising first and second control members driven by said drive means and angularly offset with reference to each other through said predetermined angle and first and second switches respectively adjacent to the paths of movement of and actuatable by said first and second control members, and means for respectively connecting said first and second control switches in circuit with said electromagnet means when said shuttle respectively receives motion from said first and second cams whereby the thus connected control switch changes the condition of said electromagnet means in synchronism with movements of the shuttle under the action of the respective cam.

13. A combination as defined in claim 12, wherein said means for connecting said control switches in circuit with said electromagnet means comprises a multi-way switch.

14. A combination as defined in claim 13, wherein said multi-way switch is actuatable by said selector means.

15. In a cinematographic apparatus for use with film having a row of perforations, a combination comprising a gate; reversible drive means; and film transporting means comprising a shuttle having film-advancing claw means, first and second cams rotatable by said drive means and respectively having first and second cam portions arranged to effect movements of said claw means in and counter to the normal direction of film transport, said cams being angularly offset with reference to each other through a predetermined angle, selector means operable to maintain said shuttle in engagement with one of said cams at a time so that the shuttle respectively receives motion from said first and second cams when said drive means respectively rotates in a first and a second direction, electromagnet means having energized and deenergized conditions and arranged to effect movements of said claw means into and away from adjoining perforations in response to changes in the condition thereof, and control means for changing the condition of said electromagnet means in synchronism with rotation of that cam which transmits motion to said shuttle, said control means comprising a rotary control member driven by said drive means and rotatable with reference to said drive means through said predetermined angle and control switch means in circuit with said electromagnet means and indirectly actuated by said control member to change the condition of said electromagnet means in synchronizm with movements of said shuttle under the action rf said first and second cams when said drive means respectively rotates said control member in said first and second directions, said control switch means comprising stationary first contact means and rotary second contact means receiving motion from said control member, said stationary first contact means comprising first and second fixed contacts and said rotary contact means being connected with one terminal of said electromagnet means and being intermittently engaged by said fixed contacts in response to rotation thereof, said selector means comprising means for connecting a selected fixed contact with the other terminal of said electromagnet means whenever the selected fixed contact is engaged by and disengaged from said rotary contact means.

16. A combination as defined in claim 15, wherein said rotary contact means comprises a plurality of discrete rotary contacts and wherein said first fixed contact is engaged by a larger number of discrete rotary contacts than said second fixed contact during each revolution of said rotary contact means.

17. A combination as defined in claim 16, wherein said first and second fixed contacts are respectively engaged by eighteen and six discrete rotary contacts per second.

* * * * *